Patented Dec. 14, 1943

2,336,484

UNITED STATES PATENT OFFICE 2,336,484

PIGMENTED LACQUER EMULSION

Gustave Klinkenstein, Maplewood, Conrad Frey, Nutley, and Edwin F. Tuttle, Jr., Woodridge, N. J., assignors to Maas & Waldstein Company, Newark, N. J., a corporation of New Jersey No Drawing. Application April 16, 1941, Serial No. 388,902

25 Claims. (Cl. 260—15)

This invention relates to printing pastes for printing designs on textiles, and to methods of making them.

Essentially, the novel product herein comprises a pigment material dispersed in a water-containing resin-lacquer, and which is adapted to be readily dispersed in and form a workable printing paste or ink by incorporating it in an excess of a neutral base comprising water in preponderating amount and modifying agents including at least one component of the pigment mixture.

In one of its aspects the improved printing paste may be considered as a resin lacquer emulsion containing pigment material, the lacquer components including a major amount of a heat convertible synthetic resin modified by a plasticizing synthetic resin, both resinous materials being in non-aqueous solution and, conveniently, the plasticizing resin including or being a phenolic resin in non-aqueous solution and having incorporated therein further amounts of non-aqueous solvents together with pigment and water absorbable dispersion agent, and an amount of water sufficient to render the material pasty and give a lacquer-in-water emulsion in which the pigment is contained in and dispersed in the lacquer-resin phase as a carrier. The neutral base into which the concentrated pigment base is added may comprise water modified by small amounts of aqueous solutions of a heat convertible resin, and stabilized by a small amount of a thickening agent. The concentrated pigment paste may be mixed with the clear or neutral base and a solvent to give a material suitable for fabric printing.

In another of its aspects, the improved printing paste may be considered as a resin-lacquer emulsion containing pigment material, the lacquer components including a major amount of a heat convertible synthetic resin modified by one or more plasticizing synthetic resins, both resinous materials being in non-aqueous solution and having incorporated therein further amounts of non-aqueous solvents together with pigment and water absorbable dispersion agent, and an amount of water sufficient to render the material pasty and give a water-in-lacquer emulsion in which the pigment is contained in and dispersed in the lacquer phase as a carrier. The neutral base into which the concentrated pigment base is added may comprise water modified by a small amount of an aqueous solution of the heat convertible resin, and stabilized by a small amount of a thickening agent. The concentrated pigment paste, which is unsuited for printing, is mixed with the heavy bodied clear or neutral base and a solvent to give a lacquer-in-water emulsion suitable for fabric printing.

The novel compositions of the present invention are exemplified by the following examples:

Formula 1

| | Per cent |
|---|---|
| Urea-formaldehyde resin in non-aqueous solution (50% total solids) (solvent: xylol 75%—butyl alcohol 25%) | 10 |
| Alkyd resin solution (55% resin dissolved in xylol) | 19 |
| Phenol modified alkyd resin (60% total solids dissolved in xylol) | 6 |
| Pine oil | 6 |
| Ethylene glycol monoethyl ether | 11 |
| Water | 42 |
| Bentonite (dry) | 3 |
| Benzidine yellow (dry) | 3 |

Formula 2

| | Per cent |
|---|---|
| Urea-formaldehyde resin in non-aqueous solution (50% total solids) (solvent: xylol 75%—butyl alcohol 25%) | 10 |
| Alkyd resin solution (55% resin dissolved in xylol) | 19 |
| Phenol modified alkyd resin (60% total solids dissolved in xylol) | 6 |
| Pine oil | 6 |
| Ethylene glycol monoethyl ether | 13 |
| Bentonite (dry) | 2.3 |
| Water | 40.7 |
| Monastral blue (dry) | 3 |

The proportions of pine oil as well as the other ingredients in the above formulae vary dependent upon the particular pigment or color used.

The term "phenol-modified alkyd resins" is used to designate alkyd resins which have been modified by phenol condensation products, a classification set up in "Ellis: The Chemistry of Synthetic Resins, 1935, vol. II at page 875," reporting an article by Krumbhaar, in "Paint, Oil, and Chemical Review, 1934, vol. 96 (12), at pages 7, 9, 29; abstracted in Chem. Abs. 1934, 28, 4920."

In the preparation of the above products, a mixture is first made of the urea-formaldehyde resin solution, alkyd resin solution and the phenol modified alkyd resin solution and the pine oil which are thoroughly mixed to give a uniform product.

The three parts of dry Bentonite are usually mixed with about twenty-seven parts of water. The three parts of pigment or color are usually mixed with about fifteen parts of additional water in a separate operation to give a condition of uniform slurry. The pigment or color water mixture is then added to the Bentonite and water mixture and thoroughly mixed therewith, preferably, by stirring.

The slurry of pigment and Bentonite so produced is then slowly added, while continually stirring, to the aforesaid resin solution until the mass is emulsified. It will be found that, at this stage, the product is a water-in-lacquer emulsion, the pigment being in the resin or lacquer external phase.

The ethylene glycol monoethyl ether is then slowly added to the emulsion while continuously mixing. Thereafter the mixture is thoroughly blended and dispersed by a colloid mill. The ethylene glycol monoethyl ether not only acts as an additional thickening agent and maintains the viscosity of the emulsion and gives it a so-called heavy body but also reverses the emulsion. The resultant product is the concentrated pigment paste, which may be characterized as a lacquer-in-water emulsion in which the pigment is in the resin or lacquer internal phase and the water forms the external phase.

Clear or neutral base or thinner for use with either of the above Formulae 1 and 2:

|  | Per cent |
|---|---|
| Urea-formaldehyde resin in non-aqueous solution (50% total solids) (solvent: xylol 75%—butyl alcohol 25%) | 7 |
| Alkyd resin solution (50% resin dissolved in xylol) | 8 |
| Phenol modified alkyd resin (60% total solids dissolved in xylol) | 8 |
| Hydrogenated naphtha | 24 |
| Water soluble urea-formaldehyde resin (80% total solids dissolved in water) | 5 |
| Water | 31 |
| Bentonite (dry) | 2 |
| Methyl cellulose dissolved in water (4% total solids) | 15 |

The methyl cellulose used in the above formula should have a high viscosity, preferably on the order of from 100 to 4000 centipoises.

In the preparation of the clear or neutral base thinning menstruum the water insoluble resin solutions are first thoroughly mixed together. Then the Bentonite and water are mixed together separately and to the latter mixture is added the methyl cellulose solution and thoroughly mixed therewith. The last mentioned mixture is then slowly added to the mixture of the water insoluble resin solutions and thoroughly stirred thereinto. Then, while continually stirring the mixture thus made, the hydrogenated naphtha is added and, after it is thoroughly mixed therein, the water soluble resins are added to the mixture so formed and the mixing operation continued until the composition is emulsified. The resulting mixture is a lacquer-in-water type emulsion.

The concentrated neutral base so prepared is extended by mixing one part of the concentrated neutral base with eight parts of the methyl cellulose solution such as given in the formula for the clear or neutral base. This should be mixed thoroughly until smooth. Thereafter six to, say, about twelve parts of hydrogenated naphtha may be gradually added to the mixture thereby thickening the mass considerably to a consistency usually found suitable for printing on cloth. While so mixing the neutral base, any desired quantity of the concentrated color paste or pastes are added to obtain the desired shade and strength of color. When so mixed, the composition forms a lacquer-in-water emulsion color printing paste ready for use.

The proportions given in the foregoing examples are illustrative and may be varied depending upon the color or pigment used as well as the characteristics of the particular ingredients involved and the results sought. For instance, in the concentrated printing paste, as indicated hereinabove a phenol modified alkyd resin solution may be substituted wholly or in part for the alkyd resin solution. Desirable results have been achieved where the percentages of the resins varied while the proportions of the other ingredients ranged as follows: pine oil—5% to 10%; ethylene glycol monoethyl ether—10% to 20%; water—35% to 45%; dry Bentonite—1% to 3%; and pigment or color—2% to 10%. Furthermore, proportions of the concentrated neutral base have ranged as follows: approximately 5% to 20% of the water insoluble urea-formaldehyde solution; 5% to 20% of the alkyd resin solution; 5% to 20% of the phenol-modified alkyd resin solution; water in excess of about 25%; and not in excess of about 15% of the methyl cellulose solution. In extending or thinning the thick printing paste, eight parts of the methyl cellulose solution (strength of four percent) and from six to twelve parts of the hydrogenated naphtha may be added.

The improved products described hereinabove are adapted for immediate use in a cloth printing plant by stirring into the methyl cellulose aqueous base, which may be supplied as a separate material or prepared in the printing plant, and which, due to its novel composition insures a ready and uniform admixture and dispersion of the pigment paste therein, to give a water-dispersed pigment composition containing water in the continuous or external phase and the pigment mixture or complex in the internal or dispersed phase. The pigment paste proper, by virtue of the high dispersive efficiency of the Bentonite in association with the water and the solvents, will possess a high degree of stability and will be peculiarly susceptible of dispersion in the neutral base and the methyl cellulose aqueous base mixture due to the presence of water and of resin therein as well as in the paste itself. This common solvent effect will obviate the necessity for using wetting agents and treatments in the cloth printing plant or other establishment where the materials are to be used.

A modification of the printing paste of this invention may be exemplified by the following examples:

*Formula 3*

|  | Per cent |
|---|---|
| Urea-formaldehyde resin in non-aqueous solution (50% total solids) (solvent: xylol 75%—butyl alcohol 25%) | 10 |
| Alkyd resin solution (55% resin dissolved in xylol solution) | 19 |
| Phenol modified alkyd resin (60% total solids dissolved in xylol) | 6 |
| Pine oil | 5 |
| Hydrogenated naphtha | 15 |
| Water | 39.4 |
| Bentonite (dry) | 1.6 |
| Benzidine (yellow) | 4 |

*Formula 4*

|  | Per cent |
|---|---|
| Urea-formaldehyde solution (50% total solids) (solvent: xylol 75%—butyl alcohol 25%) | 10 |
| Alkyd resin solution (55% resin dissolved in the xylol solution) | 19 |
| Phenol modified alkyd resin (60% total solids dissolved in xylol) | 6 |
| Pine oil | 5 |
| Hydrogenated naphtha | 18 |
| Bentonite (dry) | 1½ |
| Water | 37½ |
| Monastral blue | 3.0 |

In the preparation of the above concentrated pigment pastes, a mixture is first made of the urea-formaldehyde resin solution, the alkyd resin solution, the phenol-modified alkyd resin solution, with the pine oil and the hydrogenated naphtha to give a uniform mixture. The dry Bentonite is mixed with part of the water. The pigment or color is mixed with the remaining water in a separate container to give a condition of uniform slurry. The pigment or color water mixture is then added to the Bentonite and water mixture and thoroughly mixed therewith, preferably by stirring.

The slurry of pigment and Bentonite so produced is then slowly added, while continually stirring, to the aforesaid resin solution until the mass is emulsified. The entire mass is then put through a colloid mill until the color is uniformly dispersed. The resultant product is a concentrated pigment paste unsuited for printing which may be characterized as a water-in-resin lacquer emulsion in which the pigment is in the resin or lacquer external phase and the water forms the internal phase and serves as a thickener for the composite.

To render the above concentrated pastes usable for cloth printing they may be converted into resin-in-water suspensions or emulsions by incorporation in an excess of a predominantly aqueous clear or neutral base or menstruum, one example of which is as follows:

| | Per cent |
|---|---|
| Water (119 oz.) | 93 |
| Urea-formaldehyde solution in water (80% total solids) (5 oz.) | 3.9 |
| Methyl cellulose (4 oz.) | 3.1 |

To make the printing paste ready for actuation, five and one-half parts of the concentrated pigment base are mixed with eighty-nine parts of the clear or neutral base, and five and one-half parts of xylol. This is a lacquer-in-water emulsion color printing paste.

The proportions given in Formulae 3 and 4 are illustrative and may be varied depending upon the color or pigment used as well as the characteristics of the particular ingredients involved and the results sought. For instance, in the concentrated pigment paste a phenol-modified alkyd resin solution may be substituted for the alkyd resin solution. Again, desirable results have been achieved where the percentages of the resins varied while the proportions of the other ingredients ranged as follows: pine oil—5% to 10%; water—25% to 45%; hydrogenated naphtha—15% to 20%; dry Bentonite—1% to 3%; and pigment or color—2% to 10%. In converting the concentrated pigment paste into a resin-in-water emulsion, the proportion of color may be reduced in proportion to the clear or neutral for the desired tint or shade.

In addition to the general formulae set forth hereinabove, the following specific compositions have been found to be of utility and within the scope of the present invention:

Formula 5

| | Per cent |
|---|---|
| Urea-formaldehyde resin in non-aqueous solution (50% total solids) (solvent: xylol 75%; butyl alcohol 25%) | 10 |
| Mixed alkyd resins in xylol solution | 25 |
| Pine oil | 5 to 6 |
| Ethylene glycol monoethyl ether | 11–15 |
| Water | 40–42 |
| Bentonite | 2–3 |
| Pigment or coloring matter | 1–3 |

Formula 6

| | Per cent |
|---|---|
| Urea-formaldehyde resin in non-aqueous solution (50% total solids) | 10 |
| Mixed alkyd resins | 25–28 |
| Pine oil | 6 |
| Ethylene glycol monoethyl ether | 10–20 |
| Water | 40 |
| Bentonite | 1–3 |
| Pigment or coloring matter | 2–10 |

Formula 7

| | Per cent |
|---|---|
| Urea-formaldehyde resin in non-aqueous solution (50% total solids) (solvent: xylol 75%; butyl alcohol 25%) | 10 |
| Alkyd resin | 19 |
| Phenol-modified resin | 6 |
| Pine oil (all in non-aqueous solvents) | 5–10 |
| Water | 25–45 |
| Bentonite | 1–3 |
| Pigment or coloring matter | 2–10 |

The foregoing composition is dispersed in a thinner solution containing at least 25% water, not over 15% methyl cellulose; 5–20% water-insoluble urea-formaldehyde resin; 5–20% phenol-modified alkyd resin; 5–20% alkyd resin, and 6–12% hydrogenated naphtha as a solvent.

Formula 8

| | Per cent |
|---|---|
| Urea-formaldehyde resin in non-aqueous solution (50% total solids) (solvent: xylol 75%; butyl alcohol 25%) | 10 |
| Phenol-modified alkyd resin | 25–28 |
| Pine oil | 5–6 |
| Water | 40 |
| Bentonite | 3 |
| Pigment | 3 |

Formula 9

| | Per cent |
|---|---|
| Urea-formaldehyde resin in non-aqueous solution (50% total solids) (solvent: xylol 75%; butyl alcohol 25%) | 10 |
| Phenol-modified resin | 25–28 |
| Pine oil (all in non-aqueous solvents) | 5–6 |
| Water | 40 |
| Bentonite | 3 |
| Pigment | 3 |

The foregoing is mixed in the usual manner, as described above, and is then extended or diluted for use in a thinner comprising:

| | |
|---|---|
| Water | 31 |
| Water-soluble urea-formaldehyde resin | 5 |
| Water-insoluble urea-formaldehyde resin | 7 |
| Methyl cellulose | 15 |
| Alkyd resin | 8 |
| Phenol-modified alkyd resin | 8 |

Formula 10

| | Per cent |
|---|---|
| Urea-formaldehyde resin in non-aqueous solution (50% total solids) (solvent: xylol 75%; butyl alcohol 25%) | 10 |
| Alkyd resin | 19 |
| Phenol-modified alkyd resin | 6 |
| Pine oil | 5–6 |
| Water | 40 |
| Bentonite | 3 |

|  | Per cent |
|---|---|
| Pigment | 3 |

The foregoing is mixed in the usual manner and extended or diluted by a thinner composition comprising:

|  | Per cent |
|---|---|
| Water | 31 |
| Aqueous urea-formaldehyde resin solution | 5 |
| Water-insoluble urea-formaldehyde resin | 7 |
| Alkyd resin | 8 |
| Phenol-modified alkyd resin | 15-20 |

*Formula 11*

|  | Per cent |
|---|---|
| Urea-formaldehyde resin in non-aqueous solution (50% total solids) (solvent: xylol 75%; butyl alcohol 25%) | 15-25 |
| Mixed alkyd resins (all in xylol solution) | 15-40 |
| Pine oil | 5-6 |
| Ethylene glycol monoethyl ether | 11-15 |
| Water | 40-42 |
| Bentonite | 2-3 |
| Pigment | 1-3 |

In any event, the solvent is one which is either partially or totally soluble in water and also partially or totally soluble in organic solvents.

In the use of these materials the printed fabrics may be subjected to sufficient heat to convert the urea resin into its irreversible or permanent form. The modifying effect of the alkyd resins, which have plasticizing properties, is such that the finished textile products are neither stiff nor subject to substantial crocking and have good and substantially permanent adherence to the surfaces of the individual textile fibers without completely impregnating the same as well as exhibiting remarkably fine and sharp definition of even the thinnest lines. These compositions are also characterized by a high degree of resistance to cleaners' solvents and detergents in general.

What is claimed is:

1. A method of making a pigmented lacquer emulsion, which comprises mixing an aqueous pigment slurry in an unpigmented water immiscible lacquer composed of mixed alkyd resins and a urea-formaldehyde resin in xylol solution to produce a suspension of pigment in a water-in-lacquer emulsion, then mixing this pigmented emulsion with ethylene glycol monoethyl ether to reverse the phase of the emulsion and produce a lacquer-in-water emulsion containing pigment in its lacquer phase, and thereafter thinning the pigmented lacquer-in-water emulsion by mixing with an aqueous menstruum containing effective amounts of the resinous lacquer components uniformly distributed therethrough.

2. A method of making a pigmented lacquer emulsion, which comprises mixing an aqueous pigment slurry in an unpigmented water immiscible lacquer composed of mixed alkyd resins and a urea-formaldehyde resin in xylol solution to produce a suspension of pigment in a water-in-lacquer emulsion, then mixing this pigmented emulsion with ethylene glycol monoethyl ether to reverse the phase of the emulsion and produce a lacquer-in-water emulsion containing pigment in its lacquer phase, and thereafter extending this pigmented emulsion by mixing with an aqueous menstruum containing effective amounts of the resinous lacquer components in emulsified form and modified by a thickening agent.

3. A method of making a pigmented lacquer emulsion, which comprises mixing an aqueous pigment slurry in an unpigmented water immiscible lacquer containing a plurality of synthetic resins including alkyd resin, urea-formaldehyde resin, and phenol-modified alkyd resin, all in xylol solution, to produce a suspension of a pigment in a water-in-lacquer emulsion, then mixing this pigmented emulsion with ethylene glycol monoethyl ether to reverse the phase of the emulsion and produce a lacquer-in-water emulsion containing pigment in its lacquer phase, and thereafter extending the lacquer-in-water emulsion by mixing with an aqueous menstruum containing effective amounts of at least one of the resinous lacquer components in aqueous solution.

4. As a composition of matter, a concentrated printing paste for fabric printing comprising substantially 10% urea-formaldehyde resin in non-aqueous solution (50% total solids) (solvent: xylol 75%—butyl alcohol 25%); substantially 19% alkyd resin solution (55% resin dissolved in the xylol solution); 6%–8% phenol modified alkyd resin (60% total solids); 5%–6% pine oil; substantially 40% water; 3% Bentonite (dry); and 3% pigment or color.

5. In a printing paste for fabric printing comprising a pigmented lacquer-in-water emulsion containing a concentrated pigment base including substantially 10% urea-formaldehyde resin in non-aqueous solution (50% total solids) (solvent: xylol 75%—butyl alcohol 25%); 19% alkyd resin solution (55% resin dissolved in the xylol solution); 6% phenol-modified alkyd resin (60% total solids); 5%–6% pine oil; all dissolved in a non-aqueous solvent; 40% water; 3% Bentonite (dry); 3% pigment or color, the said concentrate being dispersed in a neutral base consisting of 31% water; 7.0% water-insoluble urea-formaldehyde solution; 5% water-soluble urea-formaldehyde resin solution; 8% alkyd resin solution; 8% phenol-modified alkyd resin solution and 15% methyl cellulose.

6. Printing paste according to claim 5 in which the non-aqueous solvent comprises 10-20% ethylene glycol monoethyl ether.

7. Fabric printing composition according to claim 5 comprising substantially five and one-half parts of the concentrated pigment base, eighty-nine parts of the neutral base, and five and one-half parts of xylol.

8. As a composition of matter, a concentrated printing paste for fabric printing comprising 10% urea-formaldehyde resin in non-aqueous solution (50% total solids) (solvent: xylol 75%; butyl alcohol 25%); 25% mixed alkyd resins in xylol solution; 5%–6% pine oil; 11%–15% ethylene glycol monoethyl ether; 40%–42% water; 2%–3% Bentonite (dry); 1%–3% Benzidine yellow.

9. As a composition of matter, a concentrated printing paste for fabric printing comprising substantially 10% urea-formaldehyde resin in non-aqueous solution (50% total solids); substantially 25%–28% mixed alkyd resins in non-aqueous solution; 6% pine oil; substantially 10% to 20% ethylene glycol monoethyl ether; 1%–3% Bentonite (dry); 40% water; 2%–10% monastral blue.

10. Clear or neutral base for printing paste, comprising 93% water (119 oz.); 3.9% urea-formaldehyde solution in water (80% total solids) (5 oz.); 3.1% methyl cellulose (4 oz.).

11. As a composition of matter, a concentrated printing paste for fabric printing comprising 10% urea-formaldehyde resin in non-aqueous solution (50% total solids) (solvent: xylol 75%—butyl alcohol 25%); alkyd resin solution (55% resin dissolved in the xylol solution) and phenol modified alkyd resin (60% total solids); 5%–10% pine oil; 10% to 20% ethylene glycol monoethyl ether; substantially 40% water; 1% to 3% Bentonite (dry) and 2% to 10% pigment or color.

12. A printing paste for fabric printing comprising a pigmented lacquer-in-water emulsion containing a concentrated pigment base including substantially 10% urea-formaldehyde resin in non-aqueous solution (50% total solids) (solvent: xylol 75%—butyl alcohol 25%); substantially 19% alkyd resin solution (55% resin dissolved in the xylol solution); substantially 6% phenol-modified alkyd resin (60% total solids); 5%–10% pine oil; all dissolved in a non-aqueous solvent; 25%–45% water; 1%–3% Bentonite (dry) 2%–10% pigment or color, the said pigment concentrate paste being dispersed in a concentrated neutral base consisting of water in excess of 25%; approximately 5%–20% water-insoluble urea-formaldehyde solution; 5%–20% alkyd resin solution; 5%–20% phenol-modified alkyd resin solution and not in excess of about 15% methyl cellulose solution; (4% total solids), and eight parts methyl cellulose solution strength of 4%, and six to twelve parts hydrogenated naphtha.

13. As a composition of matter, a concentrated printing paste for fabric printing comprising substantially 10% urea-formaldehyde resin in non-aqueous solution (50% total solids) (solvent: xylol 75%—butyl alcohol 25%); 25%–28% phenol modified alkyd resin (60% total solids); 5%–6% pine oil; substantially 40% water; 3% Bentonite (dry); and 3% pigment or color.

14. A printing paste for fabric printing comprising a pigmented lacquer-in-water emulsion containing a concentrated pigment base including substantially 10% urea-formaldehyde resin in non-aqueous solution (50% total solids) (solvent: xylol 75%—butyl alcohol 25%); substantially 25%–28% phenol-modified alkyd resin (60% total solids); 5%–6% pine oil; all dissolved in a non-aqueous solvent; 40% water; 3% Bentonite (dry); 3% pigment or color, the said concentrate being dispersed in a neutral base consisting of 31% water; 7.0% water-insoluble urea-formaldehyde solution; 5% water-soluble urea-formaldehyde resin solution; 8% alkyd resin solution; 8% phenol-modified alkyd resin solution and 15% methyl cellulose.

15. As a composition of matter, a concentrated pigment paste for fabric printing comprising a pigmented lacquer-in-water emulsion containing a concentrated pigment base including substantially 10% urea-formaldehyde resin in non-aqueous solution (50% total solids) (solvent: xylol 75%—butyl alcohol 25%); 19% alkyd resin solution (55% resin dissolved in the xylol solution); 6% phenol-modified alkyd resin (60% total solids); 5%–6% pine oil; all dissolved in a non-aqueous solvent; 40% water; 3% Bentonite (dry); 3% pigment or color, the said concentrate being dispersed in a neutral base consisting of 31% water; 7.0% water-insoluble urea-formaldehyde solution; 5% water-soluble urea-formaldehyde resin solution; 8% alkyd resin solution and 15%–20% phenol-modified alkyd resin solution.

16. As a composition of matter, a concentrated printing paste for fabric printing comprising 15%–25% urea-formaldehyde resin in non-aqueous solution (50% total solids) (solvent: xylol 75%; butyl alcohol 25%), 15%–40% mixed alkyd resins in xylol solution; 5%–6% pine oil; 11%– 15% ethylene glycol monoethyl ether; 40%–42% water; 2%–3% Bentonite (dry); 1%–3% pigment or color.

17. Fabric printing composition according to claim 15 comprising substantially five and one-half parts of the concentrated pigment base, eighty-nine parts of the neutral base, and five and one-half parts of xylol.

18. A method of making a pigmented lacquer emulsion which comprises preparing a mixture of 10% urea-formaldehyde solution (75% xylol; 25% butyl alcohol), 19% alkyd resin in xylol solution and 6% phenol-modified alkyd resin in xylol solution together with 6% pine oil, and stirring to homogeneous solution; separately preparing a pigment slurry comprising 3 parts dry Bentonite mixed with 27 parts water and incorporated in a suspension containing 3 parts of pigment in 15 parts of water; adding the pigment slurry slowly and with stirring to the resin solution to produce a water-in-lacquer emulsion with the pigment being in the lacquer external phase; thereafter slowly adding 11–13% ethylene glycol monoethyl ether to the emulsion, with continuous mixing followed by blending and dispersing in a colloid mill, whereby the emulsion is bodied or thickened and reversed in phase to give a lacquer-in-water emulsion in which the pigment is in the resin or lacquer internal phase and the water forms the external phase.

19. A method of preparing a pigmented lacquer emulsion which comprises forming a resin mixture of urea-formaldehyde resin, alkyd resins, and phenol-modified alkyd resin, all in non-aqueous solution; separately preparing an aqueous pigment slurry including pigment and Bentonite; incorporating and blending the pigment slurry into the lacquer solution to form a water-in-lacquer emulsion with the pigment in the lacquer external phase; thereafter adding ethylene glycol monoethyl ether to the emulsion to thicken same and invert the phase to form a lacquer-in-water emulsion in which the pigment is in the lacquer internal phase.

20. A method of preparing a pigmented lacquer emulsion comprising forming a lacquer including urea-formaldehyde resin dissolved in xylol-butyl alcohol, alkyd resin in xylol, and phenol-modified alkyd resin in xylol; separately preparing an aqueous pigment slurry; blending the pigment slurry into the lacquer to form a water-in-lacquer emulsion with the pigment in the external or lacquer phase; and thereafter adding ethylene glycol monoethyl ether to the emulsion, thickening the same and inverting the phase to a lacquer-in-water emulsion with the pigment in the lacquer internal phase.

21. Method according to claim 20, in which the ingredients are used in the following proportions:

| | Per cent |
|---|---|
| Urea-formaldehyde resin in non-aqueous solution (50% total solids) (solvent: xylol 75%—butyl alcohol 25%) | 10 |
| Alkyd resin solution (55% resin dissolved in xylol) | 19 |
| Phenol modified alkyd resin (60% total solids dissolved in xylol) | 6 |
| Pine oil | 6 |
| Ethylene glycol monoethyl ether | 11 |
| Water | 42 |
| Bentonite (dry) | 3 |
| Benzidine yellow (dry) | 3 |

22. Method according to claim 20, in which the ingredients are used in the following proportions:

| | Per cent |
|---|---|
| Urea-formaldehyde resin in non-aqueous solution (50% total solids) (solvent; xylol 75%—butyl alcohol 25%) | 10 |
| Alkyd resin solution (55% resin dissolved in xylol) | 19 |
| Phenol modified alkyd resin (60% total solids dissolved in xylol) | 6 |
| Pine oil | 6 |
| Ethylene glycol monoethyl ether | 13 |
| Bentonite (dry) | 2.3 |
| Water | 40.7 |
| Monoastral blue (dry) | 3 |

23. A method of making a pigmented lacquer emulsion, which comprises mixing an aqueous pigment slurry in an unpigmented water-immiscible lacquer composed of mixed alkyd resins and a urea-formaldehyde resin in xylol solution to produce a suspension of pigment in a water-in-lacquer emulsion, then mixing this pigmented emulsion with ethylene glycol monoethyl ether to reverse the phase of the emulsion and produce a lacquer-in-water emulsion containing pigment in its lacquer phase, and thereafter thinning the pigmented lacquer-in-water emulsion by mixing with an aqueous menstruum containing effective amounts of the resinous lacquer components uniformly distributed therethrough.

24. A method of making a pigmented lacquer emulsion, which comprises mixing an aqueous pigment slurry in an unpigmented water immiscible lacquer composed of mixed alkyd resins and a urea-formaldehyde resin in xylol solution to produce a suspension of pigment in a water-in-lacquer emulsion, then mixing this pigmented emulsion with ethylene glycol monoethyl ether, to reverse the phase of the emulsion and produce a lacquer-in-water emulsion containing pigment in its lacquer phase, and thereafter extending this pigmented emulsion by mixing with an aqueous menstruum containing effective amounts of the resinous lacquer components in emulsified form and modified by a thickening agent.

25. A method of making a pigmented lacquer emulsion, which comprises mixing an aqueous pigment slurry in an unpigmented water immiscible lacquer containing a plurality of synthetic resins including alkyd resin, urea-formaldehyde resin, and phenol-modified alkyd resin, all in xylol solution, to produce a suspension of pigment in a water-in-lacquer emulsion, then mixing this pigmented emulsion with ethylene glycol monoethyl ether to reverse the phase of the emulsion and produce a lacquer-in-water emulsion containing pigment in its lacquer phase, and thereafter extending the lacquer-in-water emulsion by mixing with an aqueous menstruum containing effective amounts of at least one of the resinous lacquer components in aqueous solution.

GUSTAVE KLINKENSTEIN.
CONRAD FREY.
EDWIN F. TUTTLE, Jr.